UNITED STATES PATENT OFFICE.

EDWIN W. RICE, JR., OF SWAMPSCOTT, ASSIGNOR TO THE GENERAL ELECTRIC COMPANY, OF BOSTON, MASSACHUSETTS.

SYSTEM OF ELECTRIC DISTRIBUTION.

SPECIFICATION forming part of Letters Patent No. 537,549, dated April 16, 1895.

Application filed February 21, 1894. Serial No. 501,000. (No model.)

*To all whom it may concern:*

Be it known that I, EDWIN W. RICE, Jr., a citizen of the United States, residing at Swampscott, county of Essex, State of Massachusetts, have invented certain new and useful Improvements in Systems of Electric Distribution, of which the following is a specification.

My invention relates to systems of distribution of electric energy, and has for its object to overcome the differences of potential often existing in such systems where they cover an extensive territory or where the load upon them is heavy or varies greatly in distribution from time to time.

The solution of the problem of so distributing electric energy as to maintain uniform potential over a large area has been attempted in various ways, many of them involving disadvantages on account of expense of installation, and others, which are wasteful of current, involving loss in running expenses. Some of the disadvantages thus experienced are obviated by the system which I have devised, which is briefly to distribute continuous current over the mains by ordinary methods, all of the mains of like sign being connected as commonly practiced, and to connect various points of this extended distribution system by alternating current lines, establishing at the ends of such lines motor-generators adapted to convert the current from alternating into continuous. These motor generators may also be transformer motor generators, transforming current as well as commuting it, or the transformation may be performed in separate transformers where high potential is used in the transmission of the alternating current, as is commonly practiced, saving expense in installation. I also prefer to use any of the so-called "series-multiple" systems (by preference the Edison three-wire system), but the method I employ of feeding the distribution area is equally applicable to a two-wire system or to one involving a multiplicity of wires.

Figure 1:
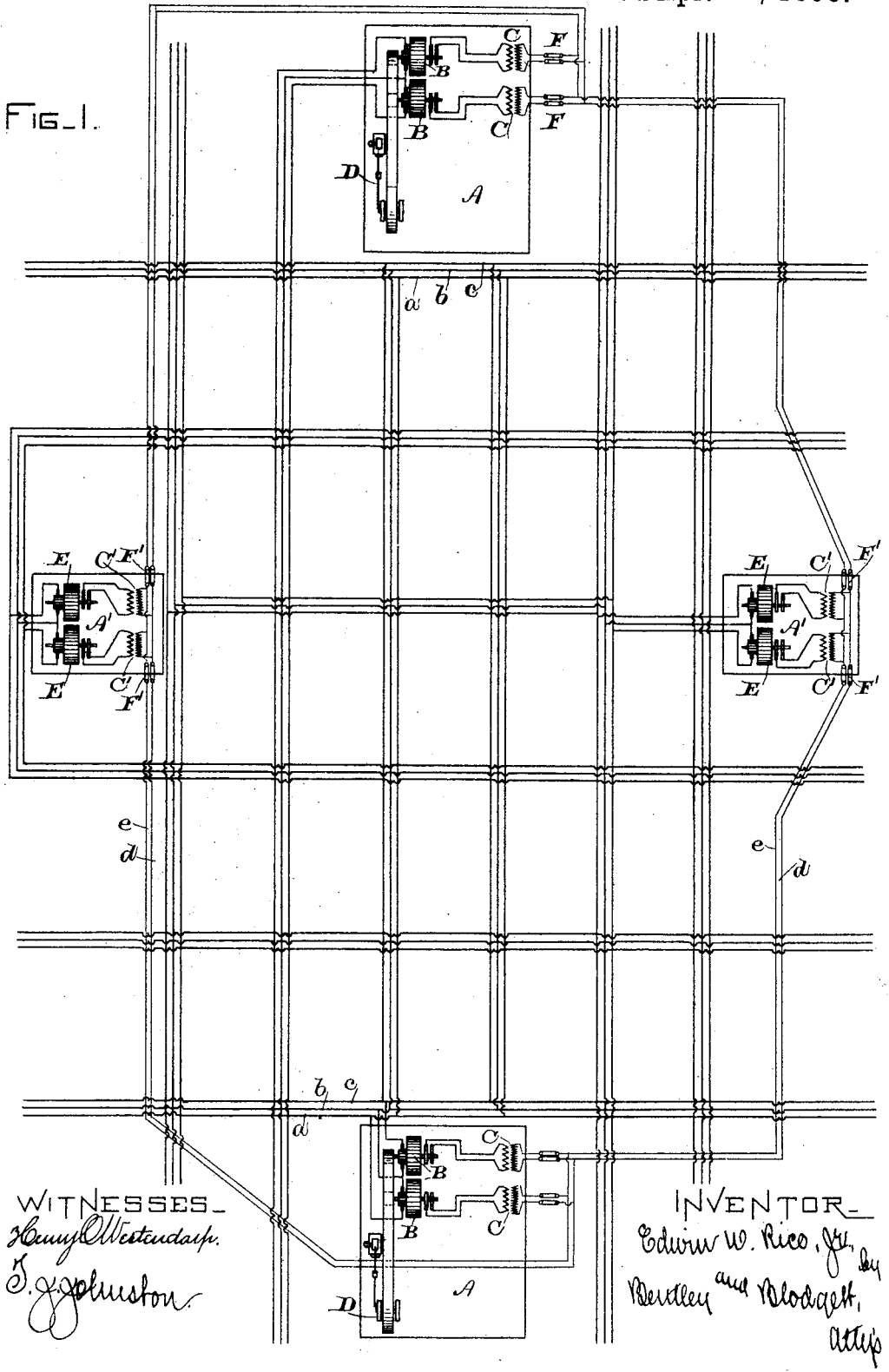
Figure 2:
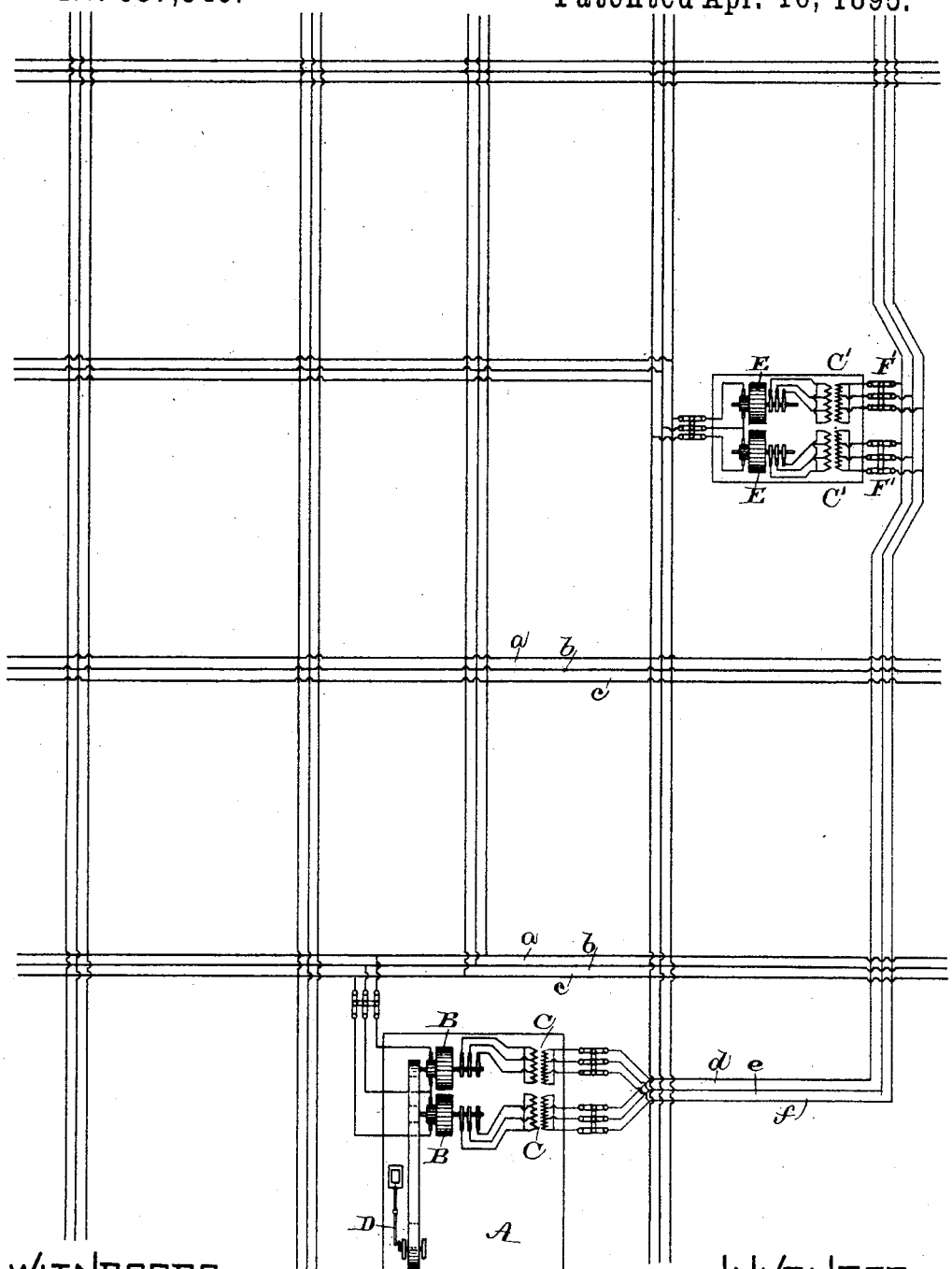

The accompanying drawings are diagrammatic representations of my improved system, Figure 1 showing the transmission of ordinary alternating currents, and Fig. 2 showing a modification adapted to three-phase alternating current.

At A, A are dynamo-electric machines operated by any suitable prime mover, such as the steam engines D, D. As represented, the dynamo-electric machines are connected to a three-wire system of lines $a$, $b$, $c$, the middle or neutral main being connected to the brushes to form a common return. The machines which I prefer have ordinary commutator connections to one side of the armature, and from the other side connections are taken to collecting rings adapted to furnish an alternating current.

As pointed out above, a two-wire system of distribution might be employed, and in that case any suitable connection might be made to the direct current side of the dynamo; for instance, they may be employed in multiple connected in the ordinary way to the bus-bars of the station, or may be connected in series if desired. The alternating current side of the apparatus is shown connected in multiple through transformers to the system; but this also may be varied at the convenience of the engineer, and the dynamos may be connected directly to the bus-bars in multiple. These various connections are all within the scope of my invention, although I make no special claim thereto, as I consider them rather a matter of engineering practice than of invention.

At A', A' are sub-stations, of which there may be as many as occasion may require, and within these sub-stations are motor-generators E, E, preferably similar in type to the dynamo-electric machines at the main stations A, A, that is, having a single winding upon the armature connected to collecting rings upon one side and to commutators upon the other side. Like the generators, these motor-generators or rotary transformers are connected to the supply mains by the three-wire system.

The collecting rings are connected to transformers C, C at the main station and from these transformers high potential lines $d$, $e$ are carried to the transformers C', C' at the sub-stations, these transformers being connected to the collecting rings of the motor generators or rotary transformers.

As already indicated, the second step of the transformation may be omitted, or rather it may be embraced in the construction of the rotary transformers themselves, and such a construction I aim to include in the claims.

In Fig. 2 I have shown a system similar in all respects to that illustrated in Fig. 1, except that I have illustrated three-phase connections from the dynamo-electric machines B, B and three-phase transformers at C, C', the transformers being connected by the lines d, e, f. The operation of this arrangement is substantially identical with that shown in Fig. 1.

In starting one of the sub-stations, current from the continuous current mains may be thrown through the motor-generators until they attain a speed approximating synchronism, and then the switches F', F' may be thrown, connecting the alternating mains to the transformers C', C', thus operating the motor-generators by the alternating current. In this method of starting, it is of importance that there should be no load or a very light load upon the motor generators, so that they may rapidly attain speed and be driven by the alternating current. In the arrangement shown in Fig. 2, this method may or may not be employed, as the three-phase currents render the alternating motor side of the armature self-starting.

By the arrangement just described I effect improved economies in the construction of large plants, because instead of using a number of power stations at different points within the distributing system, necessitating a large outlay for land and for the separate maintenance of so many stations, I may employ single stations of large capacity in situations where land is cheap, and by employing sub-stations of small size and conveying the alternating current to them at high potential and over small conductors, may maintain the current substantially equal in distribution over the whole system, and keep the potential at a point adapted to the operation of the translating devices on all of the mains. In many cases only the basement floor need be used for the sub-stations, and all the upper stories of the building may be devoted to other purposes, whereas in present installations real estate of great value must be devoted entirely to the plant located there.

It is manifest that I may employ different machines in my central station for the generation of the alternating and continuous currents respectively, although I prefer to employ a machine such as has been briefly described, because of its economy in manufacture and its small size compared to its output, and because of the convenience of regulation afforded in its construction; but as the leading feature of my invention is the feeding of continuous distribution systems by the use of a long distance transmission of alternating currents, I aim to embrace the operation of separate machines as well as of the composite machine described. Similarly, although the ordinary single wound motor-generator or rotary transformer is preferred, I may also employ a machine having two windings upon its armature, or I may even employ a separate alternating current motor to run a continuous current machine, furnishing currents of proper potential. Although two motor-generators are illustrated, it is manifest that only one may be employed in some cases.

I have not illustrated the translating devices, because these may be of any approved or convenient form, whether arc or incandescent lamps or motors of one type or another being immaterial in the practice of my invention.

What I claim as new, and desire to secure by Letters Patent of the United States, is—

1. In a system of distribution of electric energy, central stations equipped with sources of continuous current and with sources of alternating current, sub-stations adapted to convert alternating current into continuous current, and alternating current feeder lines connecting the main stations and the sub-stations together, in combination with mains adapted to supply translating devices connected to all of the stations, such mains being also interconnected.

2. In a system of distribution of electric energy, sources of continuous current and of alternating current, mains covering an extended area and connected to the sources of continuous current, alternating current lines connecting the distant parts of the system, and means adapted to commute the alternating currents and deliver them to the continuous current mains at a potential suitable for the translating devices supplied thereby.

3. In a system of distribution of electric energy, a central station plant composed of dynamo-electric machines adapted to simultaneously furnish continuous and alternating currents, a system of mains connected directly to the continuous current side of such dynamos, alternating current lines taking current from the alternating side thereof, and motor-generators supplied by such alternating current lines and adapted to furnish continuous currents to the distant parts of the system.

4. In a system of distribution of electric energy, a central station plant provided with dynamo-electric machines adapted to simultaneously generate continuous and alternating currents, continuous current mains connected to the commutators of such dynamo-electric machines, alternating lines connected to the collecting rings of such machines, step-up transformers in such alternating current lines, lines leading from the step-up transformers to step-down transformers, located at a distant part of the system, and motor-generators taking alternating current from the step-down transformers and delivering continuous current of proper potential to the continuous current mains.

5. In a system of distribution of electric energy, a central station plant provided with dynamos adapted to generate continuous and alternating currents, a series-multiple or three-wire system taking continuous current from such dynamos, an alternating current transmission, and motor-generators taking current from the alternating current transmission and delivering continuous current to the three-wire system.

6. In a system of distribution of electric energy, a central station provided with dynamos adapted to generate continuous current and alternating current, a three-wire system connected to the continuous current side of such dynamos, step-up transformers connected to the alternating current side thereof, alternating current lines leading from such step-up transformers to step-down transformers at a distant part of the system, and motor-generators adapted to take current from the step-down transformers and deliver continuous current derived therefrom to the three-wire system.

In witness whereof I have hereunto set my hand this 19th day of February, 1894.

EDWIN W. RICE, Jr.

Witnesses:
JOHN W. GIBBONEY,
BENJAMIN B. HULL.